United States Patent Office 3,317,132
Patented May 2, 1967

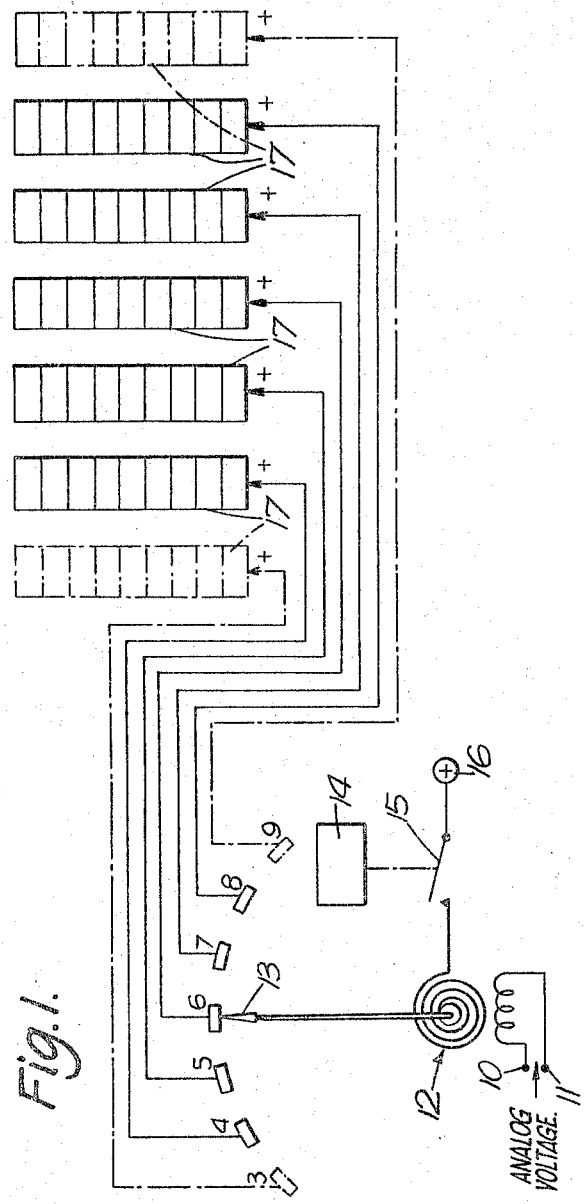

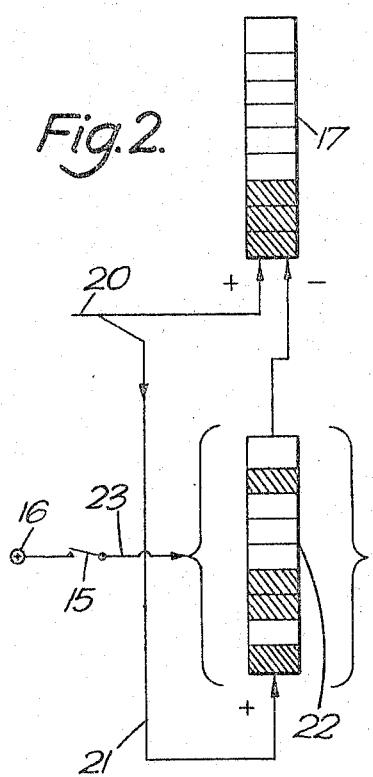

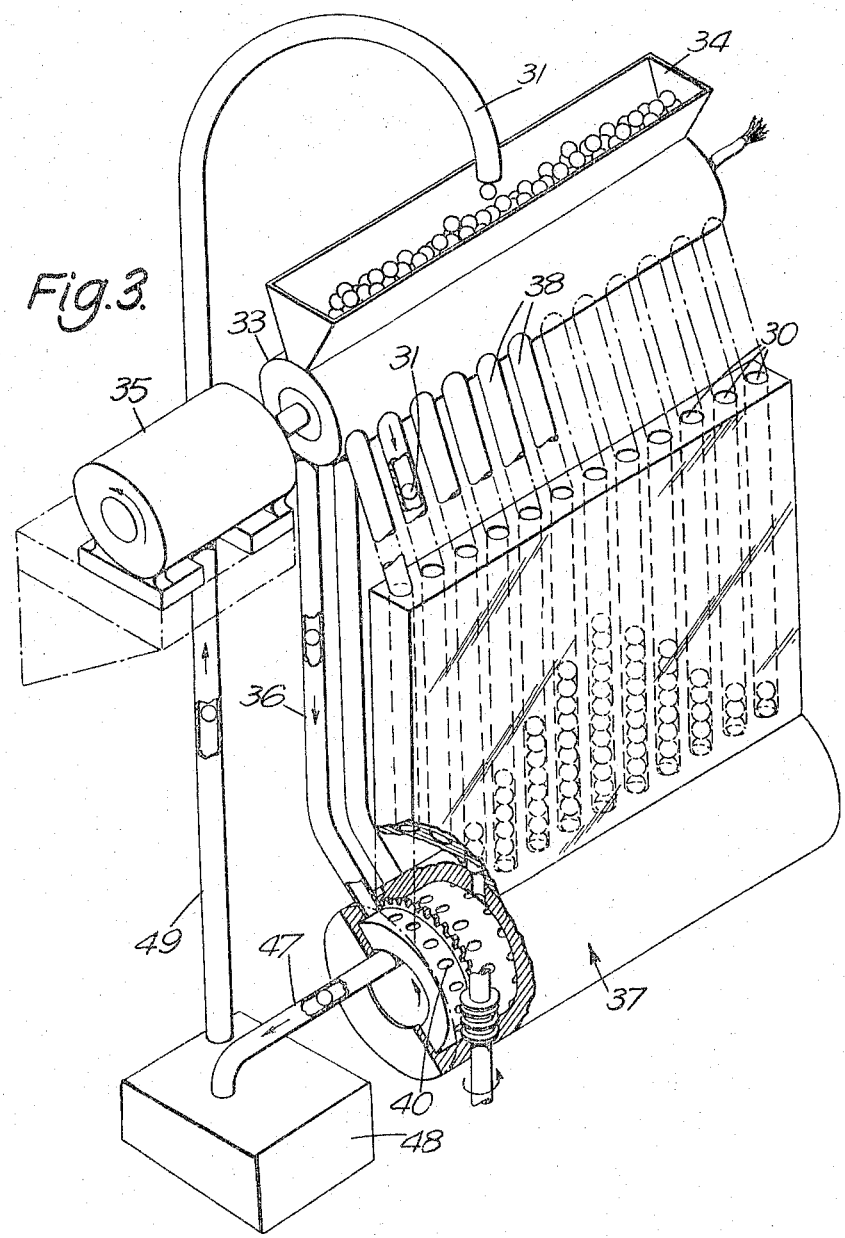

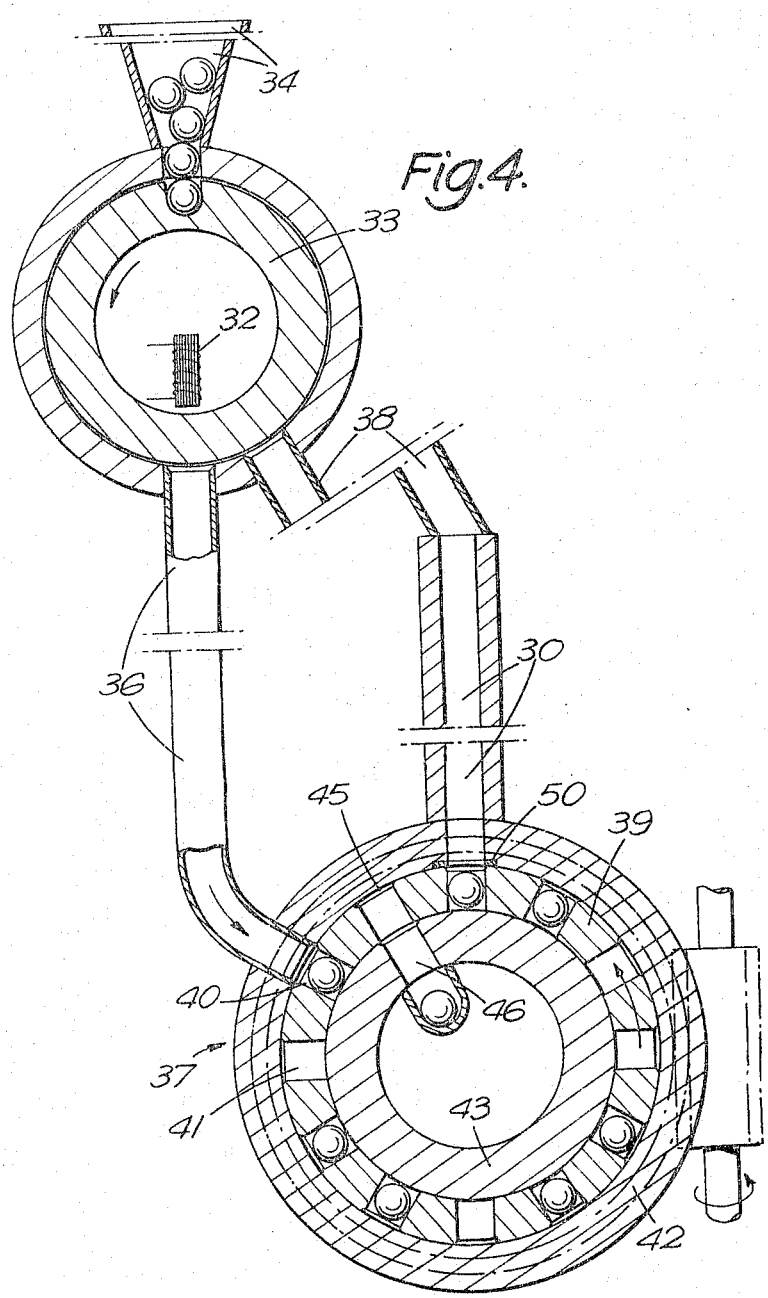

3,317,132
STATISTICAL DISPLAY APPARATUS
Robert Edgar Martin, 19 Elles Ave., Merrow,
Guildford, Surrey, England
Filed Apr. 8, 1965, Ser. No. 446,662
12 Claims. (Cl. 235—123)

This invention relates to apparatus for the statistical display of a variable, for example, a randomly varying analogue quantity.

The effects of incorrect setting or operation of automatic or manual controls in an industrial process are seen in varations of the properties of the end product. Departures from the desired value of properties can be indicated on instruments giving instantaneous values and these may be used for manual correction of automatic control systems. These indicated values, however, do not give any measurement of the effect of the variations on the output of the process in terms of the duration of the variations which will, if long enough, affect the final product.

A chart recording enables an operator to view a given period in retrospect and to gauge the magnitude and duration of any oscillations about a set point. Further valuable information can be obtained by analysis of a histogram drawn from such a chart recording showing the percentage of the total time reviewed during which time the variable was within various limits of the desired value. The shape of a histogram shows errors in the operation of the automatic control, revealing, for example whether the set point is correct and showing the magnitude of any wandering or oscillation about the desired value. Such analysis of a chart recording is time consuming and methods for avoiding the manual labour of chart analysis have been developed in which the chart is inspected in a machine to enable the time during which variables remain between various pairs of limits to be summed on integrating counters which can be read to give the ordinates of the histogram.

The present invention is directed to the automatic display of information in histogram form.

According to this invention, satistical display apparatus comprises a series of counters or count-indicators, one for each of a number of discrete ranges of a variable, and means for periodically actuating the appropriate counter or count-indicator in accordance with the instantaneous value of a variable. In the simplest form, the apparatus might periodically be re-set manually and such apparatus would provide a histogram display of the variable covering the period after it is set into operation. Preferably, however, means are provided for periodically or gradually adjusting each counter or count-indicator to remove each item of information put into the counter or count-indicator after a predetermined time interval. For example, the counters or count-indicators might be periodically actuated every 30 seconds, so that, after each such time interval, one particular counter or count-indicator is actuated to increase its total, the counter or count-indicator being selected in accordance with the instantaneous value of the variable to be displayed, and the information put into each counter, or count-indicator might be removed in such a case, say, after 1 hour; for this purpose each counter or count-indicator has the information put into at one instant removed after 1 hour. The display would thus be a histogram representing conditions during the past hour. Instead of removing a unit of information completely after 1 hour or any other time period, it may in some cases be preferred to remove the information gradually, for example, exponentially, so that the histogram represents past conditions but with a weighting in favour of more recent information.

The apparatus of the present invention, may be used, for example, for monitoring an automatically controlled process or operation and will give an immediate indication of incorrect settings in automatic controls affecting the variable being observed. The period covered by the information in the display and the rate of counting would be made suitable for the particular process or variable concerned.

In one arrangement a quantizer quantizes the variable periodically, that is to say the instantaneous magnitude of the variable is periodically determined to see within which range limits it comes, and the quantizer is arranged to operate an appropriate one of a number of display stores corresponding to the various discrete ranges. The quantizer is also arranged to operate simultaneously further stores, one for each display store, which further stores hold the information for the predetermined period over which the histogram display is to be operative and are arranged so that at the end of this period, the further store passes the information as a subtracting signal to the appropriate display store to remove a unit from the display. The display stores may be electrically operated and in this case the further stores may each consist of a shift register in which the information is moved on periodically, conveniently at the rate of quantization of the input, the number of units in the register being such that a given input will pass to the output of the register in the required time period of the histogram display.

For some purposes however it may be preferred to employ a mechanical or electro-mechanical device, in which pointers or "thermometer type" indicators are moved to form a display of the histogram. In one such an arrangement, each counter may comprise a transparent or slotted tube into which balls or the like are fed so that the number of balls or the like in a tube gives a visual indication of a count. In one convenient arrangement there are provided a number of such display tubes corresponding to the number of counters required (i. e. the number of discrete levels of the variable to be utilised in the display) and, each time the variable is quantized, a corresponding number of balls or the like are discharged to separate outlets, a selected one of the balls or the like being fed into one of the display tubes corresponding to the quantized value of the variables whilst the other balls or the like are fed into locations in a mechanical store corresponding to the non-selected display tubes whereby the mechanical store will have one of a row of locations empty and the remainder of the row full; the mechanical store at a subsequent time is arranged to selectively extract a ball or the like from the tube corresponding to the vacant location. The mechanical store may conveniently comprise a cylinder with a number of rows of holes forming locations for said balls or the like, each row extending axially along the length of the cylinder and the cylinder being rotated beneath the tubes containing the balls or the like so that, if a vacant location comes beneath a tube, the lowest ball or the like in the tube will move into the vacant location in the cylinder. In this construction, after the row has passed beneath the tubes, all the balls may be removed therefrom and fed back to a hopper for re-discharge into the tubes and mechanical store.

The following is a description of two embodiments of the invention, reference being made to the accompanying drawings, in which:

FIGURE 1 illustrates a simple form of electrical statistical display apparatus;

FIGURE 2 illustrates a modification of part of FIGURE 1 so that the apparatus continuously gives an indication of the history over a predetermined previous period;

FIGURE 3 is a perspective, partly diagrammatic, view of an electro-mechanical form of statistical display apparatus;

FIGURE 4 is a vertical section through part of the apparatus of FIGURE 3;

Figure 7:
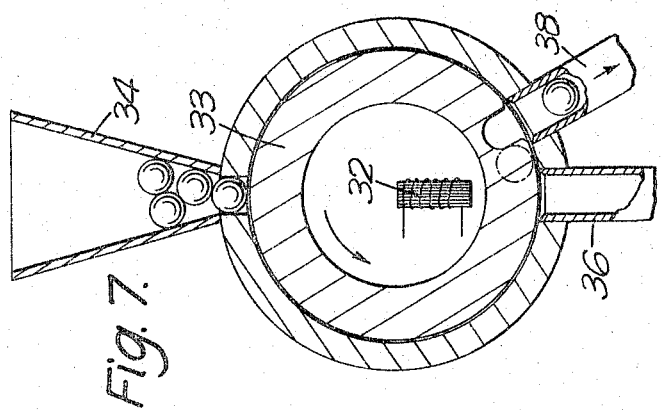
FIGURES 5, 6 and 7 are diagrams similar to part of FIGURE 4 and illustrating the operation of the apparatus.

Referring to FIGURE 1 the input quantity is an analogue voltage applied to terminals, 10, 11. This electrical signal is quantized by an arrangement illustrated diagrammatically as a voltmeter 12 having a contact member 13 which moves selectively over a suitable number of arcuate fixed contacts numbered 3 to 9. A clock device 14 periodically operates a switch 15 to apply a voltage to the contact 13 from a voltage source indicated diagrammatically at 16. This voltage is thus applied to a selected one of the fixed contacts 3 to 9 according to the magnitude of the input voltage on terminals 10, 11. The signals from the contacts 3 to 9 are fed into corresponding display stores which may comprise relays or cold cathode tubes or ferrite or valve or semiconductor bistable circuits connected to an illuminated or other display whereby the counted signals become visible. It will be seen that with the simple arrangement of FIGURE 1, provided all the stores are initially empty, after a predetermined time the display will be a histogram giving a history of the period since the apparatus was set in operation. Although for simplicity the quantizing has been illustrated as a contact making meter, it will be appreciated that this device may be completely electrical comprising for example a number of trigger circuits arranged to operate at different voltage levels. With the arrangement of FIGURE 1 it will be necessary to empty the stores periodically. FIGURE 2 illustrates however how each display store may be re-set by removing each counted unit at a predetermined time interval, for example 1 hour, after it has been put in the display. Referring to FIGURE 2, the signals from the quantizing device, which are fed via a lead 20 to one of the display stores 17, are also fed by a lead 21 to a shift register 22 in which the information is shifted on periodically by a shift command on a lead 23. The length of the register 22 is made to correspond to the time period of the required histogram display and the output from the shift register is fed to the display store 17 so that one unit is subtracted from the display each time a unit of information passes to the output of the shift register. It will thus be seen that the display store 17 maintains a count of the number of units received on the line 20 over the period corresponding to the time duration of the passage through the said register 22. There would be one such shift register for each of the display stores and thus the display stores 17 would always indicate automatically the histogram corresponding to a predetermined past time period. There are many known ways of constructing shift registers and it might for example be formed of relays or hot or cold cathode tubes or ferrite cores or semiconductor circuits.

It will be appreciated also that an exponential memory characteristic may be provided by using, for each display store, a storage capacitor which is charged by the appropriate quantized outputs from the quantizing device in combination with display means for displaying the potential across the capacitor.

Figure 6:
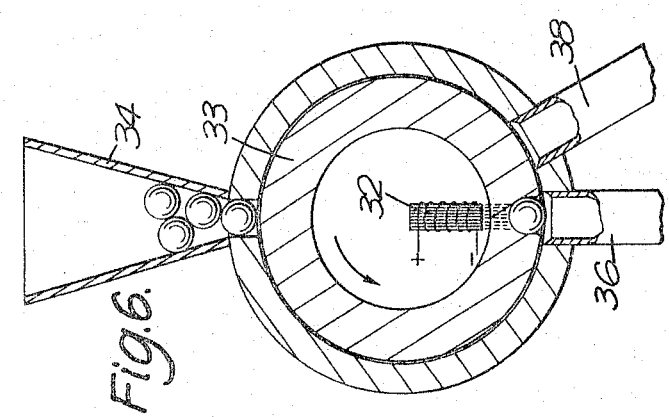
Figure 5:
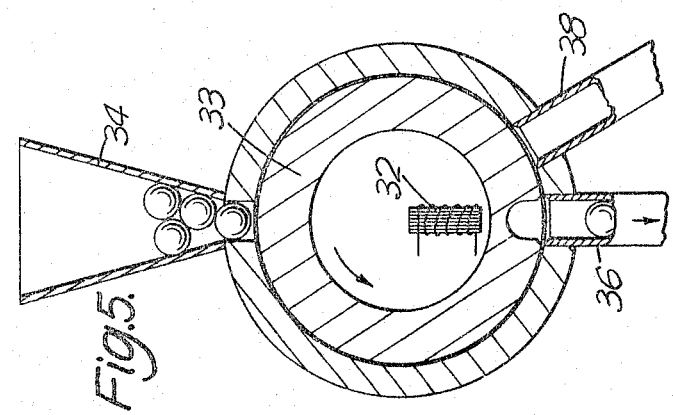

FIGURES 3 to 7 illustrate an electro-mechanical device making use of small balls 31, similar to ball bearings, for storage, counting and display purposes. The display comprises a number of transparent vertical tubes 30 (or alternatively slotted tubes through which balls may be visible) and into which balls are selectively dropped at fixed intervals of time to form histograms. The particular tube chosen is dependent upon the quantized value of the variable to be measured. The quantizing device may be any convenient device, such as that illustrated in FIGURE 1 or an equivalent electrical circuit as previously discussed which provides electrical outputs on any one of a number of leads corresponding to the selected quantity. The output signal is fed to an appropriate one of a number of electro magnets 32, one associated with each tube 30. Each time the variable is quantized, a rotary valve 33 driven by an intermittent drive mechanism 35, e.g. a ratchet or Geneva mechanism, releases a number of balls 31, corresponding to the number of tubes 30, from a hopper 34. If the magnets 32 are unenergised, all the balls would fall from the valve straight down tubes 36 to a storage device 37 to be described later. One magnet however of the series is energised by the quantizer and this causes one of the balls to be momentarily retained in the valve as the latter is rotated so that the ball is deflected, as shown in FIGURES 5 to 7, down an outlet tube 38 from the valve 33 into the selected one of the tubes 30. The storage device 37 comprises a drum 39 having a number of rows of holes 40 extending along its length, the number of holes 40 in each row corresponding to the number of columns 30 and the number of rows being one greater than the number of quantizing intervals in the period to be displayed on the histogram display. The drum 39 is rotated intermittently, through angular steps corresponding to the row spacing around the drum, in synchronism with the release of balls from the hopper. It will thus be seen that each row of holes, as it is positioned below the tubes 36, receives balls providing a record in negative form of the position of the ball fed to the display; in other words the selected position is marked by the vacant hole such as is shown for example at 41 in FIGURE 4. The storage drum 39 is between an outer surrounding cylinder 42 and an inner cylinder 43, which inner and outer cylinders are fixed and serve to retain balls in the holes 40, the thickness of the drum 39 being such that only one ball can be accommodated in each hole. The drum is located immediately below the tubes 30 so that when an empty hole 40 is below a particular tube 30, a ball is extracted from that tube. On indexing to the next step this row moves to the position shown at 45 in FIGURE 4 where all the balls in the row can fall through passages 46 extending radially inwardly into a fixed inner cylinder whence the balls are fed via a ramp 47 (FIGURE 3) to a well 48 to be returned to the hopper 34 via a tube 49 by means of a feed conveyor (not illustrated). From the position 45 the next step of movement of the drum 39 brings the row of holes beneath the ends of the tubes 36 so that, in this position all the holes in a row except one will be filled by balls when they are released from the hopper 34. It will be appreciated that, because of the provision of the extracting position 45 the number of steps of movement of the cylinder is one more than the required number of time intervals of the storage system. Since the number of balls in the display together with the number of balls in the storage hopper 34 and drum 39 is constant, it is necessary to start the equipment with the display empty and the drum 39 full except for one ball in each row missing as is normally the case. If the balls missing from the storage drum 39 are distributed evently between the various columns 30 for the first revolution of the drum then after one revolution has been completed the display will commence to be of value, adjusting itself step by step to the actual situation. It will be appreciated however that during the first revolution of the drum after the apparatus has been set in motion, no balls should be removed from the display and therefore a shutter valve 50 is provided which is automatically kept closed until the first revolution is complete. After this a cam on the drum advance mechanism is used to open the shutter thus allowing the columns of the display to be supported by the balls now in the storage drum except in the case where a display ball has to be extracted as preivously described. If such a shutter valve 50 is provided, then the distribution of the vacant holes along the various rows when the apparatus is set in operation is immaterial. The capacity of a given display column is made compatible with the storage capacity of the drum so that, if the analogue value remains constantly at a set value, the appropriate column becomes 100% full, balls being simultaneously added to the top by tube 38 and removed at the bottom by the storage drum 39.

I claim:

1. Statistical display apparatus for displaying, in histogram form, information regarding the relative number of times sampled instantaneous values of a variable fall within each of a number of discrete ranges of the variable comprising a separate counting display device for each discrete range of the variable, a sampling device for periodically sampling the variable so as to determine within which discrete range the instantaneous value lies, selector means operated by said sampling device to actuate the appropriate display device selected in accordance with the sampled value so as to increase the counted indication on that device and means operated in accordance with the sampling rate of said sampling device to adjust each of the displayed counts to represent counts of samples in each discrete range over a predetermined number of samples.

2. Statistical display apparatus for displaying, in histogram form, information regarding the relative number of times sampled instantaneous values of a variable fall within each of a number of discrete ranges of a variable comprising a separate counting display device for each discrete range of the variable, a sampling device for periodically sampling the variable so as to determine within which discrete range the instantaneous value lies, selector means operated by said sampling device to actuate the appropriate display device selected in accordance with the sampled value so as to increase the counted indication on that device and means for adjusting each counting device to remove each item of information after a predetermined time interval after the insertion of that item.

3. Statistical display apparatus for displaying, in histogram form, information regarding the number of times, within a predetermined time period, sampled values of a variable fall within each of a number of discrete ranges of the variable, which apparatus comprises a quantizer quantizing said variable periodically, a number of display stores, one for each of said number of discrete ranges of the variable, said display stores being adapted to indicate the number of stored units of information, a number of further stores associated respectively each with one of the display stores, selector means for feeding information from the quantizer to the appropriate one of said display stores and the appropriate one of said further stores according to the range within which the variable lies, each further store being a delay register operative after a predetermined time interval to pass out each stored unit of information, and means operative to utilize each unit of information passed out from the further stores to subtract a unit from the corresponding display store whereby each display store provides a count indication of units within the appropriate range of the variable received during a time interval corresponding to the delay of the further stores.

4. Statistical display apparatus as claimed in claim 3 wherein the display stores are electrically operated and wherein said further stores each consist of a shift register in which the information is moved on periodically, the number of units in the register being such that a given input will pass to the output of the register in the required time period of the histogram display.

5. Statistical display apparatus as claimed in claim 4 wherein the information is moved on periodically in the shift registers at the rate of quantization.

6. Statistical display apparatus for displaying, in histogram form, information regarding the number of times, within a predetermined period, sampled values of a variable fall within each of a number of discrete ranges of the variable, which apparatus comprises a quantizer quantizing said variable periodically, a number of display stores each comprise a tube and balls, the tube having a window so that the number of balls in the tube is visible to give a visual indication of a count, selector means controlled by said quantizer for feeding a ball into the appropriate display store tube each time the variable is quantized and means operative each time a ball is fed into a display store tube to remove a ball from the tube after a predetermined time interval.

7. Statistical display apparatus as claimed in claim 6 wherein there is provided a mechanical store having a number of rows of locations for balls corresponding to the number of display stores and wherein said selector means comprises means for discharging simultaneously each time the variable is quantized a number of balls corresponding to the number of display stores, means for diverting one ball to the selected display tube and for feeding the other balls to locations in respective rows in said mechanical store whereby the mechanical store will have one of a row of locations empty and the remainder filled and wherein said means operative after a predetermined time interval to remove a ball from a tube comprises means responsive to the vacant location in a row of said mechanical store to extract a ball from the tube corresponding to that location in the row.

8. Statistical display apparatus as claimed in claim 7 wherein said mechanical store comprises a cylinder with a number of rows of holes forming locations for said balls, each row extending axially along the length of the cylinder and wherein means are provided for rotating the cylinder beneath the tubes containing the balls so that, if a vacant location comes beneath a tube, the lowest ball in the tube will move into the vacant location in the cylinder.

9. Statistical display apparatus as claimed in claim 8 wherein means are provided for removing all the balls from each row in the storage cylinder after the row has passed beneath the tubes and for feeding said balls back to a hopper for re-discharge into the tubes and mechanical store.

10. Statistical display apparatus as claimed in claim 9 and having a shutter valve arranged for preventing discharge of balls from the tubes into the mechanical store during the first revolution of the latter after being set in operation.

11. Statistical display apparatus for displaying, in histogram form, information regarding the relative number of times sampled instantaneous values of a variable fall within each of a number of discrete ranges of a variable comprising a separate counting display device for each discrete range of the variable, a sampling device for periodically sampling the variable so as to determine within which discrete range the instantaneous value lies, selector means operated by said sampling device to actuate the appropriate display device selected in accordance with the sampled value so as to increase the counted information on that device and timing means operated in synchronism with the rate of sampling of said sampling means to remove, from each counting device, each unit of information after a period corresponding to a predetermined total number of samples.

12. Statistical display apparatus for displaying, in histogram form, information regarding the relative number of times sampled instantaneous values of a variable fall within each of a number of discrete ranges of a variable comprising a separate counting display device for each discrete range of the variable, a sampling device for periodically sampling the variable so as to determine within which discrete range the instantaneous value lies, selector means operated by said sampling device to actuate the appropriate display device selected in accordance with the sampled value so as to increase the counted information on that device and means for adjusting each counting device to remove individual items of information therefrom at an exponential rate.

(References on following page)

References Cited by the Examiner

UNITED STATES PATENTS

| | | | |
|---|---|---|---|
| 1,726,331 | 8/1929 | Ashworth. | |
| 1,760,646 | 5/1930 | Herz. | |
| 2,190,497 | 2/1940 | Whitby et al. | |
| 2,194,305 | 3/1940 | Hirschler et al. | |
| 2,453,239 | 11/1948 | Lyhn. | |
| 2,537,628 | 1/1951 | Hanson et al. | 35—24 |
| 2,607,891 | 8/1952 | Townsend | 235—92 |
| 2,621,854 | 12/1952 | Sprague et al. | 235—92 |
| 2,811,790 | 11/1957 | Kohne | 35—24 |
| 2,848,709 | 8/1958 | Jansky et al. | 235—61 |
| 2,851,534 | 9/1958 | Bray et al. | 235—92 |
| 2,927,246 | 3/1960 | Read | 235—92 |
| 2,935,255 | 5/1960 | Reiner | 235—92 |
| 3,225,178 | 12/1965 | Giot et al. | 235—92 |
| 3,230,357 | 1/1966 | Godlove et al. | 235—145 |

FOREIGN PATENTS

| | | |
|---|---|---|
| 175,084 | 6/1953 | Australia. |
| 735,993 | 6/1943 | Germany. |
| 816,817 | 7/1959 | Great Britain. |

RICHARD B. WILKINSON, *Primary Examiner.*

S. A. WAL, T. J. ANDERSON, *Assistant Examiners.*